United States Patent
Glasson

(10) Patent No.: US 7,100,861 B2
(45) Date of Patent: Sep. 5, 2006

(54) LEAD GUIDE FOR CABLE EXTENSION TYPE POSITION SENSORS

(75) Inventor: Richard Glasson, Whippany, NJ (US)

(73) Assignee: Control Products, Inc., East Hanover, NJ (US)

( * ) Notice: Subject to any disclaimer, the term of this patent is extended or adjusted under 35 U.S.C. 154(b) by 0 days.

(21) Appl. No.: 11/135,971

(22) Filed: May 24, 2005

(65) Prior Publication Data

US 2005/0205710 A1    Sep. 22, 2005

Related U.S. Application Data

(63) Continuation of application No. 10/350,292, filed on Jan. 23, 2003, now abandoned.

(60) Provisional application No. 60/351,007, filed on Jan. 23, 2002.

(51) Int. Cl.
*B65H 75/34* (2006.01)

(52) U.S. Cl. .................. 242/397; 242/615; 242/615.3; 242/476.7

(58) Field of Classification Search ............... 242/397, 242/615, 615.3, 476.7
See application file for complete search history.

(56) References Cited

U.S. PATENT DOCUMENTS

| | | | |
|---|---|---|---|
| 3,777,273 A | 12/1973 | Baba et al. |
| 3,988,710 A | 10/1976 | Sidor et al. |
| 4,005,396 A | 1/1977 | Fujiwara et al. |
| 4,057,904 A | 11/1977 | Vrable et al. |
| 4,214,180 A | 7/1980 | Kuwako et al. |
| 4,342,884 A | 8/1982 | Ban et al. |
| 4,356,557 A | 10/1982 | Bell et al. |
| 4,367,998 A | 1/1983 | Causer |
| 4,413,245 A | 11/1983 | Bartholomaus et al. |
| 4,425,557 A | 1/1984 | Nakamura |
| 4,497,375 A | 2/1985 | Mucheyer et al. |
| 4,653,190 A | 3/1987 | Spain, Jr. |
| 4,737,698 A | 4/1988 | McMullin et al. |
| 4,914,389 A | 4/1990 | Juds |
| 4,999,579 A | 3/1991 | Winfried |
| 5,200,747 A | 4/1993 | Betz et al. |
| 5,389,876 A | 2/1995 | Hedengren et al. |
| 5,444,369 A | 8/1995 | Luetzow |

(Continued)

FOREIGN PATENT DOCUMENTS

DE    19908036    8/2000

(Continued)

OTHER PUBLICATIONS

Applied Technologies Group, *Part Design for Ultrasonic Welding*, Branson, Nov. 1999.

(Continued)

*Primary Examiner*—William A. Rivera
*Assistant Examiner*—Sang Kim
(74) *Attorney, Agent, or Firm*—Gibbons, Del Deo, Dolan, Griffinger & Vecchione

(57) ABSTRACT

A position sensor and sensor assembly having a spool onto which is wound a plurality of individual windings to make up a cable coil. A free end of the cable extends through a guide for attachment to an object whose position is desired to be sensed. The cable passes through an elongated slot formed the guide and which is preferably formed at a predetermined angle with respect to the central axis of rotation of the spool. By means of the elongated slot, the individual windings can be wound about the spool without successive windings overlapping each other. The elongated slot further has an internal surface that has a minimum radius to prevent the cable from making too small a bend during the winding function.

25 Claims, 4 Drawing Sheets

U.S. PATENT DOCUMENTS

| | | | |
|---|---|---|---|
| 5,659,248 | A | 8/1997 | Hedengren et al. |
| 5,693,935 | A | 12/1997 | Hassler, Jr. et al. |
| 5,757,179 | A | 5/1998 | McCurley et al. |
| 5,768,946 | A | 6/1998 | Fromer et al. |
| 5,789,917 | A | 8/1998 | Oudet et al. |
| 5,841,274 | A | 11/1998 | Masreliez et al. |
| 5,894,678 | A | 4/1999 | Masreliez et al. |
| 5,901,458 | A | 5/1999 | Andermo |
| 5,936,399 | A | 8/1999 | Andermo et al. |
| 5,955,881 | A | 9/1999 | White et al. |
| 5,973,494 | A | 10/1999 | Masreliez et al. |
| 6,160,395 | A | 12/2000 | Goetz et al. |
| 6,259,249 | B1 | 7/2001 | Miyata et al. |
| 6,279,248 | B1 | 8/2001 | Walters |
| 6,335,618 | B1 | 1/2002 | Nahum |
| 6,353,314 | B1 | 3/2002 | Moerbe |
| 6,360,449 | B1 | 3/2002 | Steentjes |
| 6,381,863 | B1 | 5/2002 | Steinich |
| 6,487,787 | B1 | 12/2002 | Nahum et al. |
| 6,499,225 | B1 | 12/2002 | Steinich |
| 6,501,264 | B1 | 12/2002 | Shiraishi et al. |
| 6,522,129 | B1 | 2/2003 | Miyata |
| 6,543,152 | B1 | 4/2003 | Steinich |
| 6,545,461 | B1 | 4/2003 | Miyata |
| 6,611,138 | B1 | 8/2003 | Vasiloiu |
| 6,636,035 | B1 | 10/2003 | Kiriyama et al. |
| 6,646,434 | B1 | 11/2003 | Miyata et al. |
| 2003/0131724 | A1 | 7/2003 | Neumann |

FOREIGN PATENT DOCUMENTS

| | | |
|---|---|---|
| EP | 0896855 A | 2/1999 |
| JP | 11211410 | 8/1999 |

OTHER PUBLICATIONS

Applied Technologies Group, *Ultrasonic Staking, Branson*, Nov. 1999.

Murakami, Taku, *Precision Angle Sensor Unit for Construction Machinery*, International Off-Highway & Powerplant Congress & Exposition, Sep. 8-10, 1997.

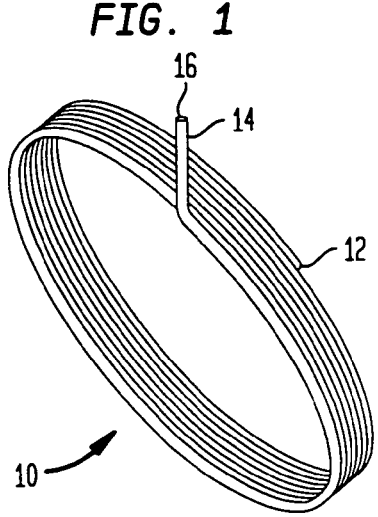
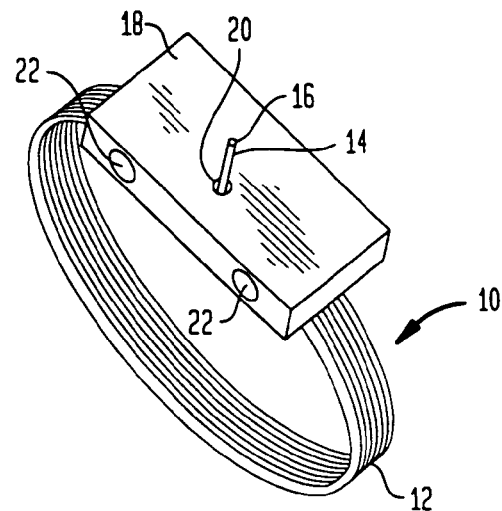
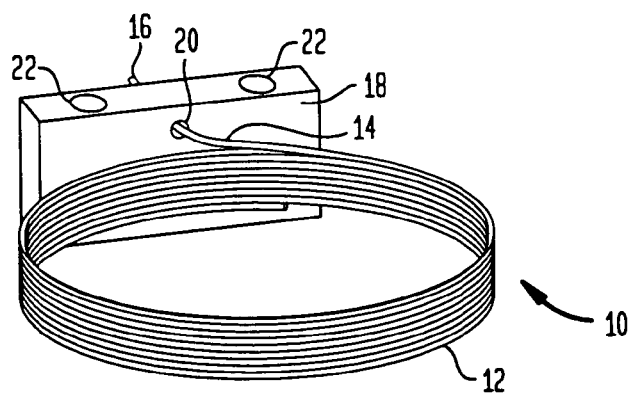
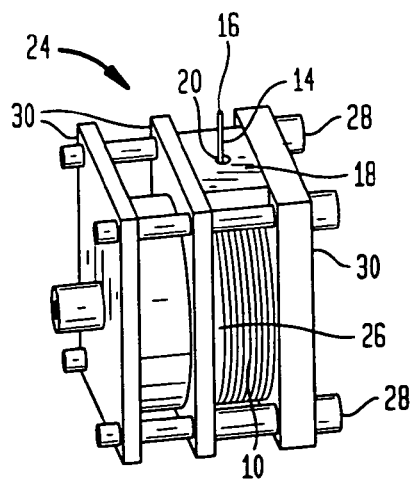

LEAD GUIDE FOR CABLE EXTENSION TYPE POSITION SENSORS

RELATED APPLICATIONS

This application is a Continuation of Ser. No. 10/350,292, filed on Jan. 23, 2003 now abandoned, which is based upon and claims the benefits of U.S. Provisional Patent Application 60/351,007, filed on Jan. 23, 2002.

FIELD OF THE INVENTION

The invention generally relates to position related sensors, and more particularly to a system to wind a cable about a spool in a position related sensor.

BACKGROUND

There are, of course, many different types of position related sensors, that is, sensors that sense the position of some physical object and provide information as to the location of that object. One such sensor is shown and described in pending U.S. patent application Ser. No. 09/793,218 entitled "PRECISION SENSOR FOR A HYDRAULIC CYLINDER" and which, in turn, is a continuation-in-part of U.S. Pat. No. 6,234,061, issued on May 22, 2001, entitled "PRECISION SENSOR FOR A HYDRAULIC CYLINDER" and which was based upon U.S. Provisional application 60/104,866 filed on Oct. 20, 1998 and the disclosure of all of the foregoing applications and issued U.S. Patent are hereby incorporated into this specification by reference.

As can be seen, particularly in U.S. Pat. No. 6,234,061, a position sensor is disclosed that utilizes a cable that is coupled to the object to be sensed. This cable is wound around a spool and, as the cable unwinds or winds about the spool, the movement of the spool allows the position sensor to accurately determine the rotational movement of the spool and translate that rotational movement into a precise location of the object. In principle, therefore, the position sensor causes the cable to wind about the spool in a plurality of successive coils when the object moves in the direction toward the coil and unwinds those coils as the object moves away from the spool.

Accordingly, one of the difficulties with the afore-described type of position sensor is to have some system or mechanical function that provides a easy means to direct the cable to wind and unwind about the spool in an orderly fashion so that the winding function creates an even coiling of the cable without overlapping of any of the individual windings that make up the aggregate cable coil. The overlapping of individual windings of the cable coil has a deleterious effect on the accuracy of the position sensor.

Accordingly, one means of mechanically coiling the cable about the spool is to provide a guide in the form of a frame member or other fixed structural member associated with the rotatable spool such that the cable passes through a hole in that guide so that the guide serves to locate the cable along the spool in winding the cable thereon. Typically the hole formed in the guide is a small, circular hole and the cable therefore passes through that small, circular hole in the guide to reach the spool when it is wound and unwound in a cable coil as the spool rotates.

The hole-type guide, however, feeds the cable from one location. As consecutive windings of the coil are laid down, the new windings get wound about the spool further and further away from the feed point, which is the location of the stationary hole in the guide. At some point during winding, the position of an individual winding of the cable becomes so remote from the stationary small, circular, stationary hole that the cable winds over itself. In this way, the winding cable type of position sensor may be limited in sensing distance by the number of consecutive winds that can be made without the overlapping of individual windings of the cable coil.

Accordingly, it would be advantageous to have a position sensor that can utilize the feature of a cable wound about a spool that is not so constrained by the problem of the cable winding over itself but can be more assured that the continued winding of the cable will properly position each winding of the cable about a spool adjacent the previous winding so that the position sensor can be capable of an extended range of position sensing.

SUMMARY OF THE INVENTION

A position sensor according to the present invention provides a accurate sensor utilizing the spool and cable type of sensing mechanism where the cable is wound about the spool and the rotation of the spool responsive to the winding and unwinding of the cable allows the sensor to determine the position of an object being sensed in a manner as shown and described in the aforementioned U.S. Pat. No. 6,234,061.

The present invention allows a significantly greater number of turns to be wound onto a cable spool, without the cable coiling over itself. This substantially extends the range of cable extension type sensors, while maintaining full accuracy.

The position sensor of the present invention includes a rotatable spool around which the cable is coiled in a plurality of individual windings. A distal end of the cable is affixed to the object desired to be sensed and the rotational position of the spool is then detected as the object moves toward and away from the spool, thereby winding and unwinding the cable and causing the spool to rotate in a direct correlation to the position of the object with respect to the spool.

With the present invention, however, the spool is located within or adjacent to a guide that is provided as a fixed structure or frame for the spool and that guide has an elongated slot formed therein through which the cable passes as it winds and unwinds about the spool. The advantage of the elongated slot design depends upon the fact that the cable can follow the winding as it progresses across the spool. In this way, the point at which the cable is fed through the guide is never too far from the point at which the latest winding is forming. There is no tendency for the cable to wind over itself.

In addition, the main axis of the elongated slot can be at an angle with respect to the main rotational axis of the spool, and preferably at a preferred range of angles, such that additional advantages are realized. As one such advantage, the use of an angular orientation of the slot with respect to the spool creates a winding bias that causes the cable to always start at one side of the spool and wind in neat, consecutive rows of windings toward the other side of the spool. In the preferred embodiment, the elongated slot is a closed configuration.

As further features of the present invention, the guide itself can be constructed to provide a predictable starting point for the cable winding upon the spool; the guide can be formed so as to minimize surface abrasion as the cable passes thorough the elongated slot formed in the guide and the configuration of the guide can be designed to control the radius of any bends that the cable must undergo in the winding and unwinding of the cable about the spool.

BRIEF DESCRIPTION OF THE DRAWINGS

A more complete understanding of the invention may be obtained from consideration of the following description in conjunction with the drawings in which:

FIG. 1 is a is a perspective view of a cable coil illustrating multiple windings;

FIG. 2 is a perspective view of the cable coil of FIG. 1 assembled with a guide having a conventional small, circular hole through which the cable passes;

FIG. 3 is a lower perspective view of the cable coil and guide of FIG. 2;

FIG. 4 is a perspective view of the cable coil and guide installed as a component in a position sensor assembly;

DETAILED DESCRIPTION

Figure 5:
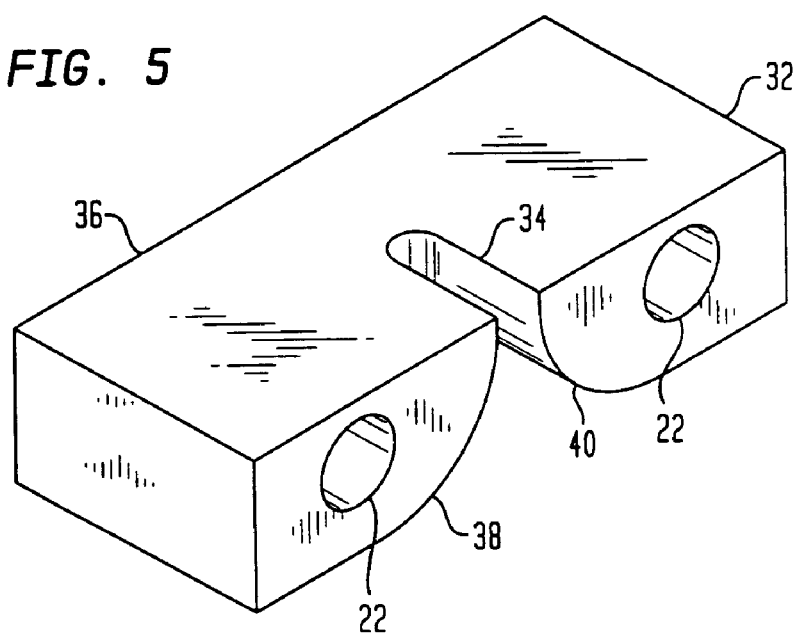
FIG. 5 is a perspective view of a guide constructed in accordance with the present invention.

In FIG. 1, there is shown a perspective view of a cable coil 10 that comprises a plurality of individual windings 12 of cable 14 and showing a free end 16 that extends from the cable coil 10 and, in accordance with the aforementioned U.S. Pat. No. 6,234,061 is adapted to be affixed to the particular object whose position is desired to be sensed. As can therefore be seen, the cable coil 10 is typical of a coil of cable that is normally wrapped around a spool of a position sensor in accordance with that patent, however, for clarity in describing the present invention, the spool has not been shown in FIG. 1.

Accordingly, as shown, the free end 16 of the cable 14 is adapted to be affixed to the particular object whose position is desired to be determined and as that object moves toward and away from the cable coil 10, the cable coil 10 will add or subtract individual windings 12 while the spool rotates. That rotation of the spool is, in accordance with the teaching of the aforementioned U.S. Pat. No. 6,234,061, measured so that the distance between the cable coil 10 and the object can be accurately determined.

Turning now to FIG. 2, there is shown a perspective view of the cable coil 10 of FIG. 1 in association with a guide 18 that can be located in a fixed position with respect to the cable coil 10. In FIG. 2, it can be seen that the guide 18 has a small, circular guide hole 20 formed in the guide 18 through which the free end 16 of the cable 14 extends and which, as indicated, can then be affixed to the object whose position is desired to be sensed. Thus, when that free end 16 is drawn outwardly or pulled inwardly with respect to the guide hole 20, the cable 14 can add or subtract the individual windings 12 about the cable coil 10, while moving the spool as described.

There are also a pair of through bores 22 formed in the guide 18 and which can be used to mount the guide 18 in the construction of a position sensor assembly as will be later explained, however other means can be used to mount the guide 18 in such construction as long as the cable 14 can pass thorough the guide hole 20 to reach the cable coil 10 to wind and unwind about the spool.

Turning now to FIG. 3, there is shown a perspective view of the cable coil 10 and the guide 18 of FIG. 2 and illustrating the lower area thereof. Thus, in FIG. 2, there can be seen the guide hole 20 that is formed in the guide 18 such that the cable 14 is wrapped in a plurality of individual windings 12 to form the cable coil 10. As can be seen, the individual windings 12 extend away from the fixed location of the guide hole 20 such the as each new individual winding 12 is formed when the cable is being wound around a spool, the individual windings 12 are located laterally further and further away from the guide hole 20 and eventually, a point is reached that the individual winding 12 is sufficiently laterally spaced away from the guide hole 20 that it simply cannot continue to form a single depth, individual winding 12 but instead begins to wind over itself, that is, the last winding 12 overlaps the next to last winding and not produce a single depth winding that is adjacent to that last formed winding.

At that point, the efficiency of the ultimate position sensor is compromised as it important that the individual windings 12 that make up the cable coil 10 not overlap each other or create a double thickness of cable 14.

In addition, it can be seen in FIG. 3 that the initial winding location of the cable coil 10 is uncertain since the small, restricted, circular guide hole 20 provides no real direction or guidance as to the initial individual winding 10 or the direction the subsequent individual windings 12 are made about the spool. Thus, the initial individual winding 12 may be located at differing locations on the spool and the direction of the continued winding of the cable 14 about the spool can be uncertain, thereby also compromising the operation of the later constructed position sensor.

Turning now to FIG. 4 there is shown a perspective view of a position sensor assembly 24 that includes and houses the cable coil 10 that is wrapped around the spool 26. In the Fig, there can be seen the free end 16 of the cable 14 extends outwardly from the guide 18 for affixing to the object whose location is desired to be determined. In addition the guide 18 has been affixed in a fixed location with respect to the spool 26 and the cable coil 10 wrapped around the spool 26, by use of a set of bolts 28 that pass through the bores 22 (FIGS. 2 and 3) and are secured to a plurality of frame members 30 in the formation of the position sensor assembly 24 better described in U.S. Pat. No. 6,234,061. As such, the completed and assembled position sensor assembly 24 is shown with the guide 18 and with the small, restricted circular guide hole 20 through which the cable 14 passes and which is the means of guiding that cable 14 as it winds and unwinds from the spool 26.

Turning now to FIG. 5, there is shown a perspective view of a guide 32 constructed in accordance with the present invention. In the Fig, the guide 32 can be seen to have an elongated slot 34 formed therein as opposed to the small circular guide hole 20 of FIGS. 2–4. In the preferred embodiment, the elongated slot 34 is formed at an angle as will be later explained and as also can be seen, there is an outer surface 36 and an inner surface 38, with the inner surface 38 adjacent to the elongated slot 34 forming a curved mouth 40 that is arcuate outwardly away from the elongated slot 34 in the direction from the outer surface 36 toward the inner surface 38. Preferably the arcuate mouth 40 has a predetermined curvage of bend radius. Again, the guide 32 may have through bores 22 that can be used as with the prior art embodiment, in order to facilitate the assembly of the eventual position sensing assembly.

Figure 6:
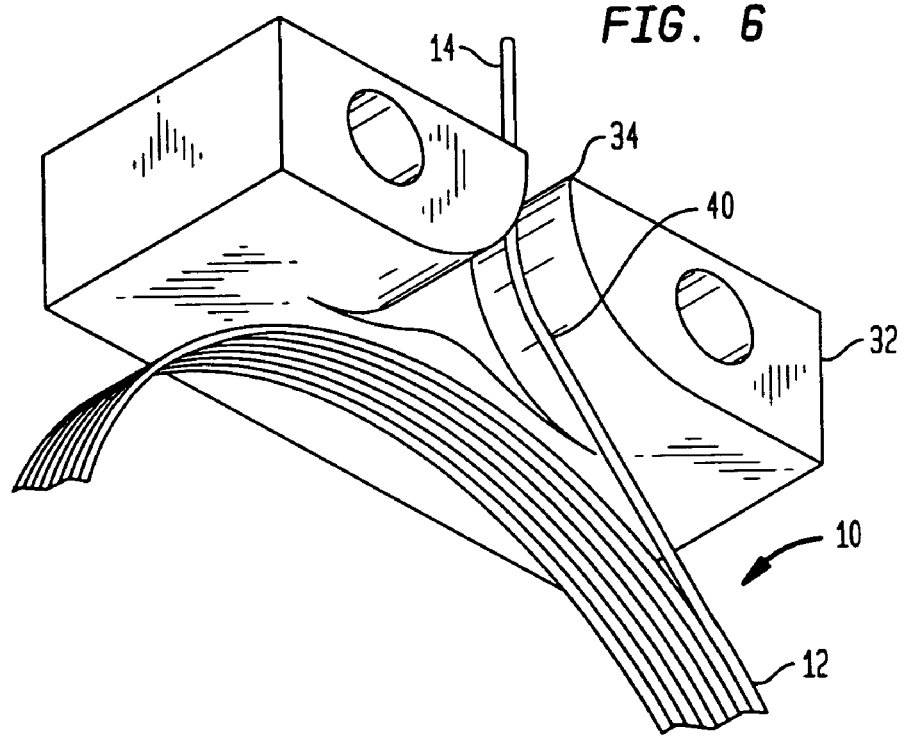
FIG. 6 is a perspective view of the guide of FIG. 5 in position with respect to a cable coil.

Turning next to FIG. 6, there is shown a perspective view of the guide 32 in position adjacent to a cable coil 10 having individual windings 12 formed by the cable 14. As with the prior art embodiment of FIGS. 1–4, the cable 14 passes through the guide 32 to the cable coil 10 that is, as is understood, normally wound around a rotatable spool. As can be see, the predetermined radius of the mouth 40 guides the cable 14 and prevents the cable from being bent into a sharp radius as the cable 14 passes through the elongated slot 34 to and from the cable coil 10.

Sensors of the type discussed above can use thin diameter polymer coated braided steel cable. This cable has a critical bend radius. If the cable is bent around a radius that is smaller than the critical radius, the cable service life will be severely compromised. In FIGS. 5 and 6 it can be seen that the cable 14 turns sharply as it goes through the elongated slot 34 and follows the circumference of a spool in forming the cable coil 10.

The running surface of the elongated slot 34 slot is described as the surface against which the cable 14 rubs as it passes back and forth through the elongated slot 34 and therefore includes the entrance to the elongated slot 10 as well as the arcuate mouth 40 along which the cable 14 slides in being wound to and unwound from the cable coil 10. The running surface of the elongated slot 34 must, therefore, present the radius for the cable 14 to bend around. The present invention features a large radius that is approximately 10 to 20 times the core diameter of the cable 14 and is suitable for maximum cable service life. The top edge of the elongated slot 34 is rounded with a very small radius to prevent chafing as the cable retracts.

The use of an elongated slot 34 in place of a small circular guide hole (FIGS. 2–4) provides several advantages to the eventual position sensor assembly. As an example, one of such advantages is that the elongated slot 34 allows the cable 14 to follow the individual windings 12 as they progress across the spool. In this way, the point at which the cable 14 is fed through the guide 32 is never too far from the point at which the latest individual winding 12 is forming. Accordingly there is no tendency for the cable 14 to wind over itself.

As to the construction of the guide 32, in high cycle applications the cable 14 may abrade the running surface of the guide 32 as well as elongated slot 34 and the arcuate mouth 40 and which can lead to degradation of accuracy or failure. In one embodiment, the guide 32 is milled from an aluminum block and that finished aluminum material then nickel-plated. In an alternate embodiment, the running surface of the guide 32 is formed by an appropriately shaped steel stamping. The steel stamping provides the length of the elongated slot 34 as well as the running surface thereof. As a still further material for the guide 32, the guide 32 can be constructed of a plastic material that has a metal plating applied thereto. A plastic molded mounting element can be provided to hold the stamping in the proper orientation.

Figure 7:
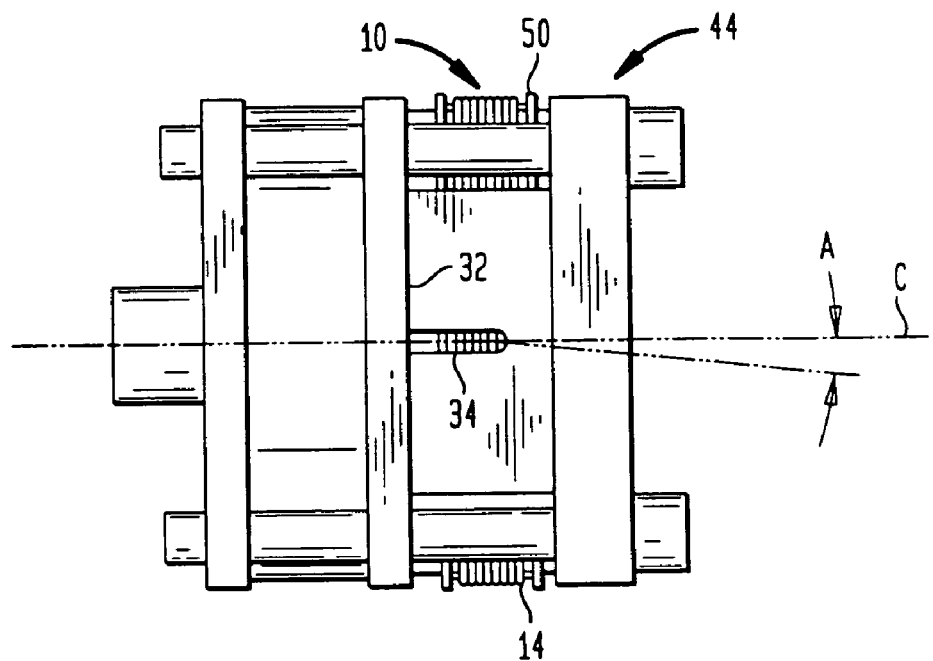
FIG. 7 is a side perspective view of the guide of the present invention installed as a component in a position sensor assembly.
Figure 8:
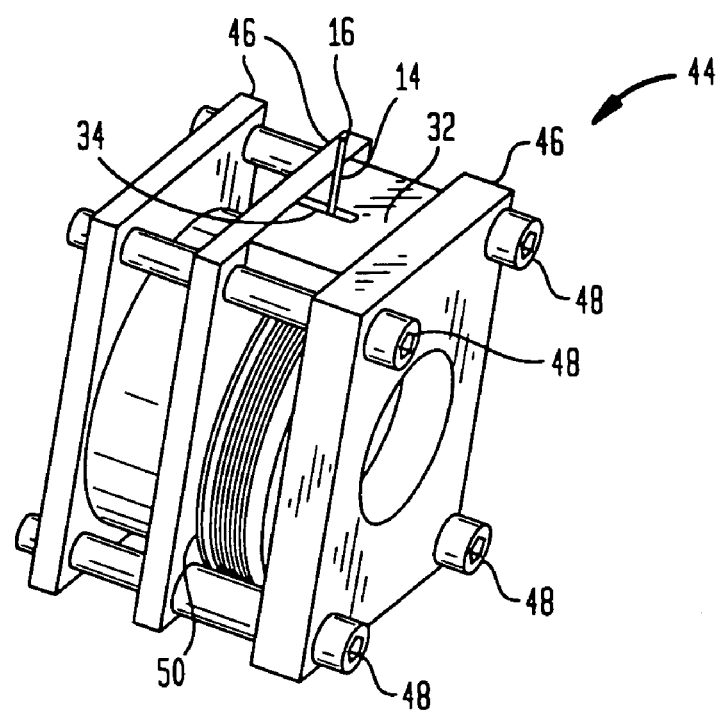
FIG. 8 is a side perspective view of the position sensor assembly of FIG. 7

Further advantages will become apparent upon a review of FIGS. 7 and 8 which are perspective views, taken from the top and side, respectively, of a position sensor assembly 44 constructed in accordance with the present invention. Accordingly, in FIGS. 7 and 8 there can be seen, the position sensor assembly 44 that has, included therein, the guide 32 constructed in accordance with the present invention and which has been mounted between frame members 46 by means of bolts 48 that firmly retain the various components of the position sensor assembly 44 together.

Again, the position sensor assembly 44 retains the spool 50 rotatably therein, about which is round the cable coil 10 having the free end 16 extending outwardly from the cable coil 10 and passing through the elongated slot 34 formed in the guide 32 to be affixed to the object whose position is desired to be detected. In FIG. 7, however, it can also be seen that the elongated slot 34 is preferably formed at an angle with respect to the main rotational axis of the spool 50, shown by the central axis line C. That angle is shown as angle A in FIG. 7 and the angled orientation of the elongated slot 34 provides still further advantages of the present invention.

By the angularity of the elongated slot 34 with respect to the main rotation axis of eth spool 50, there is created a winding bias force as the cable 14 is wound onto the spool 50 and that bias force causes the cable 14 to start always at one side of the spool 50 and wind in neat, consecutive rows toward the other side of the spool 50.

Thus, again referring to FIG. 7, it may be seen that the cable 14 is centrally fed onto the spool 50 through the angled elongated slow 34. There is a component of force created that acts on the cable 14 along outer surface of the spool 50. This force is created by the fact that the feed of the cable 14 is always being pulled against one side of the elongated slot 34 as the cable 14 travels through the elongated slot 34 and turns to go around the spool 50. Angling the elongated slot 34 slightly produces a sideward bias as the cable 14 has a tendency to minimize the distance to the spool 50.

Accordingly, in the orientation of FIG. 7, the cable 14 has a tendency to move to the right side of the elongated slot 34. The magnitude of the bias force is approximately represented by the sine of the angle A that the elongated slot 34 forms with the main rotational axis C of the spool 50. In this way the cable 14 will always wind from a particular side of the spool 50. Also, at any point in the winding process the cable 14 will exhibit a predictable tendency to stay as far to one side of the spool 50 as possible.

As the windings progress, the cable 14 will tend to follow the individual windings 12 as they move from the starting side toward the other side of the spool 50, overcoming the slot-induced bias. This is because the force required to pull an individual winding 12 over itself is greater than the bias force induced by the angled elongated slot 50. Thus, the cable 14 works its way up the elongated slot 34 as it follows the successive individual windings 12. If the angle A is too acute, the bias force will be too great and the cable 14 will not be able to follow the individual windings 12. That circumstance would result in a cable 14 that coils at one end of the elongated slot 34 only and quickly winds over itself. Conversely, if the angle of the elongated slot 34 is too small, the cable 14 will not feed predictably, as outlined above. For a particular type of sensor it has been found that a slot angle A of between 3 and 12 degrees provides desired winding.

As a further advantageous feature of the angled elongated slot 34, the guide 32 thereby provides a predictable location from which winding can begin in the case of a cable that has been fully extended. Because of the bias force exerting a tendency to always direct the cable 14 to one side, there is a feature of the elongated slot 34 that prevents the cable 14 from starting too far to that side. Failure to provide this feature can result in the cable 14 forming its initial winding toward the wrong side of the spool 50. This will result in the cable overlapping and may result in winding off of the spool 50. The elongated slot 34 in the guide 32 is therefore terminated at a closed end point that is toward the winding direction from the point at which the cable 14 is attached to the spool 50. In this way, the first winding of the cable 14 is forced to form in the desired direction. In the type sensor depicted here, the closed end of the elongated slot 34 is one to four cable-widths to the desired coiling side of the cable attachment point of the spool 50.

Figure 9:
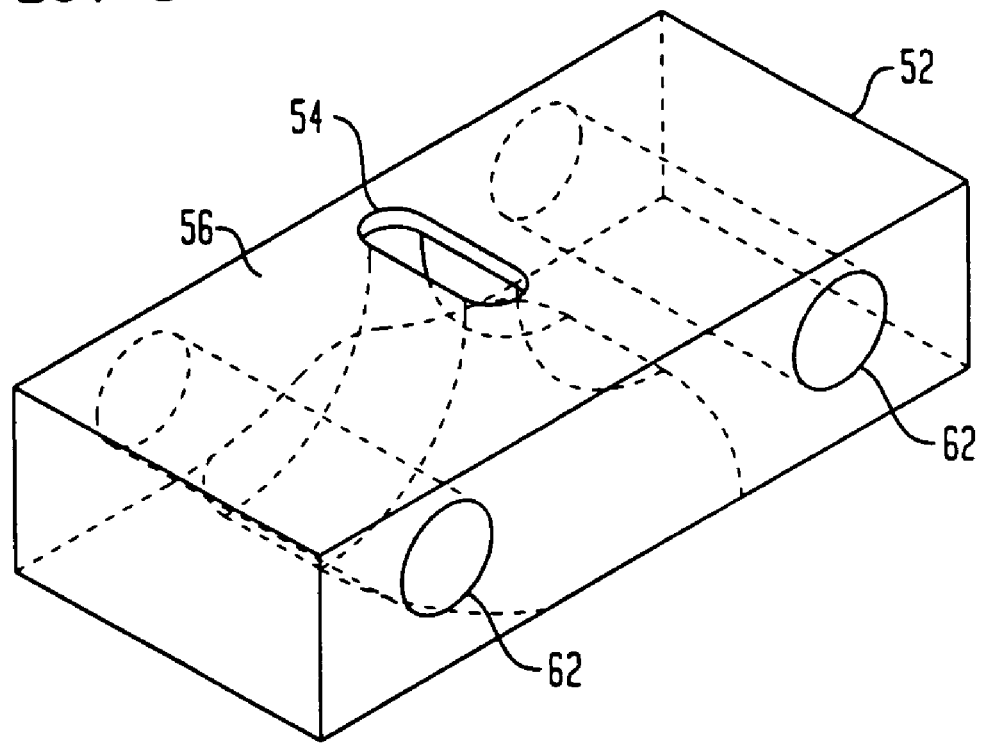
FIG. 9 is a perspective view of an alternative embodiment of the guide of the present invention.
Figure 10:
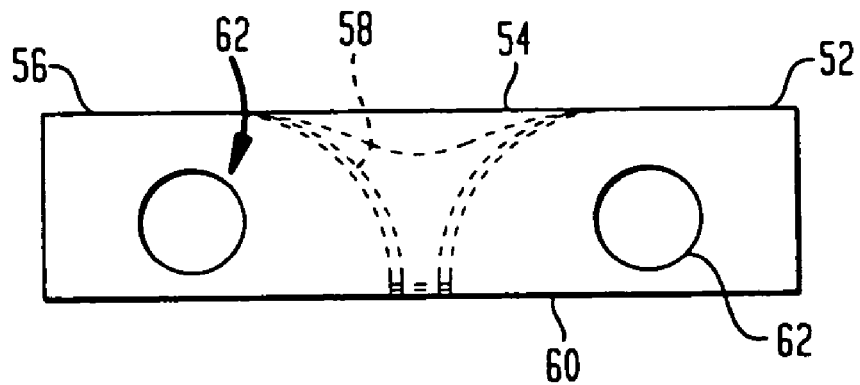
FIG. 10 is a side view of the guide of FIG. 9.

Turning now to FIG. 9, there is shown a perspective view of an alternative embodiment of the present invention and wherein the guide 52 has a closed elongated slot 54, that is, the closed elongated slot 54 has no open end and is fully formed as an oval opening within the outer surface 56 of the guide 52 thereby having no opening at either of the sides of the guide 52. Taking FIG. 10, along with FIG. 9, there is shown a side view of the guide 52 of this alternative embodiment and illustrating the curved mouth 58 that opens to the lower surface 60 of the guide 52 forming an arcuate surface of the mouth 58. In other respects, the through bores 62 are similar in appearance and use as shown and described with respect to the embodiment shown in FIGS. 5–8.

It is to be understood that the invention is not limited to the illustrated and described form of the invention contained herein. It will be apparent to those skilled in the art that various changes may be made without departing form the scope of the invention and the invention is not considered limited to what is shown in the drawings and described in the specification.

What is claimed is:

1. A position sensor having an assembly comprising a spool rotatable about a central axis of rotation, a guide having an elongated slot formed therein and a cable passing through the elongated slot and adapted to be wound around the spool to form a plurality of individual windings adjacent to but not overlapping each other wherein the guide has an inner surface facing the spool and an outer surface, and wherein the guide has an arcuate mouth formed that widens from the elongated slot at the outer surface in the direction toward the inner surface, said elongated slot being orientated to allow said cable to move along the central axis of said spool as said cable is wound around the spool.

2. The position sensor as defined in claim 1 wherein the elongated slot is oriented at an angle with respect to the central axis of rotation of the spool.

3. The position sensor as defined in claim 2 wherein the angle between the elongated slot and the central axis of rotation of the spool is approximately 3 to 12 degrees.

4. The position sensor as defined in claim 2 wherein the angle of the elongated slot produces a directional bias force to the cable when said cable is wound upon the spool.

5. The position sensor as defined in claim 2 wherein the elongated slot has an end, and where said end is located so as to provide a known location to commence the winding of the cable onto the spool.

6. The position sensor as defined in claim 5 wherein the spool has exterior sides and the end of the elongated slot is located opposite the spool at a location about 1 to 4 widths of the cable from one of the exterior sides of the spool.

7. The position sensor as defined in claim 1 wherein the guide is comprised of nickel plated aluminum.

8. The position sensor as defined in claim 1 wherein the guide is comprised of a shaped steel stamping.

9. The position sensor as defined in claim 1 wherein the elongated slot has opposite closed ends.

10. An assembly for use in a position related sensor, the assembly comprising a spool rotatable about a central axis of rotation, a guide having an elongated slot formed therein and a cable passing through the elongated slot and adapted to be wound around the spool to form a plurality of individual windings adjacent to but not overlapping each other wherein the guide has an inner surface facing the spool and an outer surface, and wherein there is an arcuate mouth formed that widens from the elongated slot at the outer surface in the direction toward the inner surface.

11. The assembly as defined in claim 10 wherein the arcuate mouth has a predetermined radius.

12. The assembly as defined in claim 11 wherein the cable has a core and the predetermined radius of the arcuate mouth is approximately 10 to 20 times the diameter of the core.

13. A position sensor, said position sensor comprising a frame, a spool rotatable affixed within the frame about a central axis of rotation, a guide affixed to the frame, the guide having an elongated slot formed therein and a cable passing through the elongated slot and adapted to be wound around the spool to form a plurality of individual windings adjacent to but not overlapping each other wherein the guide has an inner surface facing the spool and an outer surface, and wherein there is an arcuate mouth formed that widens from the elongated slot at the outer surface in the direction toward the inner surface, said elongated slot being orientated to allow said cable to move along the central axis of said spool as said cable is wound around the spool.

14. The position sensor as defined in claim 13 wherein the frame comprises a plurality of frame members and the guide is located intermediate a pair of the frame members.

15. The position sensor as defined in claim 13 wherein the elongated slot is oriented at an angle with respect to the central axis of rotation of the spool.

16. The position sensor as defined in claim 13 wherein the angle between the elongated slot and the central axis of rotation of the spool is approximately 3 to 12 degrees.

17. The position sensor as defined in claim 13 wherein the cable passing through the elongated slot has a free end external of the guide that is adapted to be affixed to an object whose position is desired to be sensed.

18. The position sensor as defined in claim 13 wherein the elongated slot has a curved internal running surface that has a predetermined radius.

19. The position sensor as defined in claim 18 wherein the cable has a core and the predetermined radius of the internal running surface is approximately 10 to 20 times the diameter of the core.

20. The position sensor as defined in claim 13 wherein the elongated slot has a closed end, and wherein the closed end is located so as to provide a known location to commence the winding of the cable onto the spool.

21. The position sensor as defined in claim 13 wherein the guide is comprised of nickel plated aluminum material.

22. A guide adapted to be located in a fixed position with respect to a spool rotatable about a central axis of rotation, the guide having an elongated slot formed to direct a cable to wind about the spool, the guide having an inner surface facing the spool and an outer surface, and wherein there is an arcuate mouth formed that widens from the elongated slot at the outer surface in the direction toward the inner surface.

23. The guide as defined in claim 22 wherein the elongated slot has a longitudinal axis formed at an acute angle with respect to the central axis of rotation of the spool.

24. The guide as defined in claim 23 wherein the guide is comprised of nickel-plated aluminum.

25. The guide as defined in claim 23 wherein the elongated slot is oval shaped having closed ends.

* * * * *